2,783,156
RUST PREVENTIVE COMPOSITION

John D. Oathout, Cranford, and Robert W. Scott, Westfield, N. J., assignors to Esso Research and Engineering Company, a corporation of Delaware No Drawing. Application August 7, 1953, Serial No. 373,034

4 Claims. (Cl. 106—14)

The present invention relates to rust preventive compositions and particularly to rust-inhibiting compositions of the thin film or solvent type. In brief compass, the invention pertains to a rust-inhibiting composition which comprises crude scale wax or its equivalents and sorbitan oleate in specific critical proportions.

Heretofore, numerous rust preventive compositions have been proposed for the protection of ferrous metals including steels in every form. These materials are generally of two types. One group is of the solvent or adherent film type involving the evaporation of a volatile solvent to leave a relatively dense coating deposited upon the surface to be protected. A common representative of this group of materials consists of a blend of petroleum sulfonate and degras in a volatile solvent as described in U. S. Patent No. 2,182,992. The other type is applied by dipping, spraying, painting or slushing the metal surface with an oil-based composition without regard to the formation of an adherent film. Such slushing oils frequently contain sorbitan oleate together with other rust preventives as shown in U. S. Patent No. 2,434,490. The present invention is concerned with the first-mentioned type of materials.

Blends of petroleum sulfonate and degras in volatile solvents, which are a widely used solvent or film-forming type of rust preventive are often unsatisfactory due to variations in quality of the non-volatile constituents. The blends may separate on standing. Rust preventive properties are often poor. Unless special precautions are taken, stain may develop on treated surfaces. The present invention overcomes these shortcomings.

It has now been discovered that an excellent film-forming or solvent type rust preventive is obtained when crude scale wax or its equivalents and sorbitan oleate are incorporated in volatile hydrocarbon solvents in definite proportions. More particularly, it has been found that a composition comprising about 70-85 wt. percent, preferably about 73-80 wt. percent, of a volatile hydrocarbon solvent boiling within the range of about 250°-450° F., preferably 300°-400° F., about 10-20 wt. percent, preferably about 13-18 wt. percent, of a light non-volatile mineral oil boiling within the range of about 500°-600° F., about 4-6 wt. percent of sorbitan mono-oleate and about 2-5 wt. percent of crude scale wax having a melting range of about 121°-127° F. has outstanding rust-preventive qualities. Wax proportions of about 2-3 wt. percent are preferred.

The product of this invention is transparent, light straw colored and shows no separation on standing at room temperature for one month. Previous products are darker in color and may show sedimentation or cloudiness of standing.

The wax used for the purposes of the invention is preferably a white crude scale wax of the melting range indicated. It may be obtained by the usual methods of separating wax from petroleum distillates, such as plate and frame pressing or solvent dewaxing and semi-finishing processes, such as "sweating" or deoiling, and it primarily consists of a mixture of straight chain paraffin hydrocarbons ranging from $C_{15}$ to $C_{30}$, but chiefly from $C_{20}$ to $C_{25}$. Sorbitan mono-oleate is a commercial product sold under the trade name "Span 80" and usually made by esterifying sorbitan with oleic acid.

The volatile hydrocarbon solvent is preferably a mixed base material containing about equal proportions of aromatic, naphthenic and paraffinic constituents. The addition of non-volatile light oil increases the storage stability of the composition, i. e. prevents it from drying out too quickly. Paraffinic or Mid-Continent mixed base oils are most suitable for this purpose.

The proportions of the other components are rather critical for optimum results. Thus, it has been found that sorbitan mono-oleate in proportions of less than 4 wt. percent is unsatisfactory, while proportions in excess of 6 wt. percent have little, if any, additional effect on the rust-inhibiting quality of the composition. Similar conditions prevail regarding the wax content. If substantially less than 2 wt. percent of wax is used, a product of poor rust preventive quality is obtained. Wax proportions substantially in excess of 3 wt. percent cause precipitation and solubility difficulties.

The type and melting point of the wax are likewise important. Microcrystalline wax has been found to be insoluble in the solvent oils required for the film-forming rust preventive here involved. Higher melting point waxes, i. e. those melting above about 130° F., present similar solubility problems and also reduce the homogeneity of the product at low temperatures. Crude scale wax of the type specified above is free of these objections. It is of particular advantage that this type of crude material may be used without further purification. Refined waxes having a melting point range of 120°-130° F. have been found to offer no observable advantage over the crude material with respect to rust preventive qualities However, they are slightly inferior in solubility characteristics.

If desired, small amounts, say about 1-3 wt. percent, of an alkylol amine, particularly phenyl ethanolamine may be added to the composition as a water displacing agent. It has also been found that the addition of these materials renders the rust preventive film resistant to finger prints.

In order to demonstrate the synergistic effect of the constituents of the present composition and its superiority over prior art materials, a number of different compositions were subjected to the standard JAN–H–792 humidity cabinet rusting test. This well known test involves suspending sand blasted steel strips in moist air maintained at a constant high temperature and at a relative humidity of 95-100%. The temperature in the present case was 120° F. Also, low temperature homogeneity after storage for one week at 0° F. followed by warming to 40° F., water displacement and storage stability (one month) were observed. The compositions used and the test results obtained are tabulated below.

| Composition, wt. percent | A | B | C | D | E | F | G |
|---|---|---|---|---|---|---|---|
| Sorbitan mono-oleate | 5 | 5 | 5 | 5 | 1 | 2.5 | (10% neutral degras; 10% of a 50% solution of Na petroleum sulfonate in oil.) |
| Crude scale wax, 121°–127° F., M. P. | 5 | 2.5 | 1 | 2.5 | 5 | 2.5 | 0. |
| Phenyl ethanolamine | 2 | 2 | 2 | 0 | 2 | 2 | 2. |
| Treated and filtered paraffinic distillate, I. B. P. 503° F., vis. 40 SSU at 100° F. | 13 | 15.5 | 17 | 17.5 | 17 | 18 | 0. |
| Mixed base hydrocarbon solvent B. R. 311°–391° F. (Varsol). | 75 | 75 | 75 | 75 | 75 | 75 | 78. |
| Humidity cabinet life, hours, 120° F. at 100% R. H. | >850 | >850 | ~800 | >850 | | | ~300. |
| Low temperature homogeneity | Fail | Pass | Pass | Pass | | | Pass. |
| Water displacement | Fair | Good | Good | Fair | | | Good. |
| Storage stability, one month at room temperature. | Good | Good | Good | Good | Unsatisfactory; Sorbitan mono-oleate Concentration too low; Phenyl ethanolamine separates on standing. | | Fair (cloudiness and/or sediment may develop). |

It will be noted that the humidity cabinet life of blends A, B and D which are made up in accordance with the present invention exceeds 850 hours. It may be as high as 1,000 hours at these conditions. It is apparent that blend C which contains 1 wt. percent of wax is greatly inferior and that the prior art blend G remains far below 720 hours. The data also demonstrate the inferiority of blends E and F which contain insufficient sorbitan mono-oleate and are of unsatisfactory stability. Blend A which contains 5% paraffin wax, i. e. more than the preferred proportion, is of satisfactory stability but shows inferior low temperature homogeneity.

If desired, the composition of the invention may be prepared from suitable concentrates of the critical constituents. Such a concentrate may consist of up to about 50 wt. percent of sorbitan mono-oleate mixed into the crude scale wax by blending the sorbitan mono-oleate with the molten wax.

A concentrate from which rust preventives may be blended is comprised of up to 50% Span 80 in crude scale wax. The melting point range of the wax is preferably between 121°–127° F. The concentrate may also contain the phenyl-ethanol-amine in proportions of about 2 parts phenyl-ethanol-amine to 5 parts Span 80. The advantage of such concentrates is ease of handling and lower cost for the finished blends. With the concentrate, finished rust preventives of either the solvent or thin film type may be prepared at bulk terminal plants, or by the consumer at the point of use by merely adding the necessary amounts of solvent and/or mineral oil. Thus, final costs are reduced, since the cost of shipping the concentrate plus costs of bulk shipping the base materials is considerably less than the cost of shipping the finished products from the point of manufacture. Furthermore, the consumer may, with this concentrate and two types of base materials (solvent and mineral oil), blend a wide variety of rust preventives suitable for a wide variety of applications.

What is claimed is:
1. A rust inhibiting composition of the solvent and film-forming type which consists essentially of about 73–80 wt. percent of a volatile hydrocarbon solvent boiling within the range of about 250°–450° F., about 13–18 wt. percent of a non-volatile light hydrocarbon oil boiling within the range of about 500°–600° F., about 2–3 wt. percent of white crude scale wax melting within the range of about 121°–127° F., about 4–6 wt. percent of sorbitan mono-oleate and about 1–3 wt. percent of phenyl ethanol amine.

2. The composition of claim 1 in which said wax consists of straight chain hydrocarbons of $C_{15}$–$C_{30}$ chain length, hydrocarbons of $C_{20}$–$C_{25}$ chain length predominating.

3. A rust inhibiting composition of the solvent and film-forming type which consists essentially of about 70 to 85 wt. percent of a volatile hydrocarbon solvent boiling within the range of about 250 to 450° F., about 10 to 20 wt. percent of a non-volatile light hydrocarbon oil boiling within the range of about 500 to 600° F., about 2 to 3 wt. percent of white crude scale wax melting within the range of about 121 to 127° F., and about 4 to 6 wt. percent of sorbitan mono-oleate.

4. A rust inhibiting composition of the solvent and film-forming type which consists essentially of about 73 to 80 wt. percent of a volatile hydrocarbon solvent boiling within the range of about 250 to 450° F., about 13 to 18 wt. percent of a non-volatile light hydrocarbon oil boiling within the range of about 500 and 600° F., about 2 to 3 wt. percent of white crude scale wax melting within the range of about 121 to 127° F., and about 4 to 6 wt. percent of sorbitan mono-oleate.

References Cited in the file of this patent
UNITED STATES PATENTS

| | | |
|---|---|---|
| 2,434,490 | Duncan | Jan. 13, 1948 |
| 2,471,889 | Paliwoda | May 31, 1949 |
| 2,482,517 | Schiermeier | Sept. 20, 1949 |
| 2,563,609 | Matuszak | Aug. 7, 1951 |
| 2,564,423 | Barnum | Aug. 14, 1951 |
| 2,580,036 | Matuszak | Dec. 25, 1951 |
| 2,637,703 | Dixon | May 5, 1953 |

OTHER REFERENCES

"Atlas Surface Active Agents," 2nd printing (1948), Atlas Powder Company, Wilmington, Del. (p. 21 relied upon).